US007581108B1

(12) United States Patent
Bohm et al.

(10) Patent No.: US 7,581,108 B1
(45) Date of Patent: Aug. 25, 2009

(54) METHOD AND SYSTEM FOR GENERATING TIME-BASED IDENTIFIERS

(75) Inventors: Denis Bohm, Los Altos, CA (US); Michael G. Lamming, Palo Alto, CA (US); Robert N. Mayo, Mountain View, CA (US); Jeffrey A. Morgan, Cupertino, CA (US); Kan Zhang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 499 days.

(21) Appl. No.: 10/829,714

(22) Filed: Apr. 21, 2004

(51) Int. Cl.
*H04L 9/32* (2006.01)
(52) U.S. Cl. .......................................... 713/178; 380/44
(58) Field of Classification Search ................ 707/1–2, 707/6, 100–102; 340/539.11, 539.13–539.19; 705/50, 52; 726/20–21, 30
See application file for complete search history.

(56) References Cited

U.S. PATENT DOCUMENTS

| 5,640,151 | A * | 6/1997 | Reis et al. .................. 340/10.2 |
| 6,185,307 | B1 * | 2/2001 | Johnson, Jr. ................. 380/270 |
| 6,269,342 | B1 * | 7/2001 | Brick et al. ................... 705/20 |
| 6,574,665 | B1 * | 6/2003 | Khotimsky ................. 709/224 |
| 6,609,085 | B1 * | 8/2003 | Uemura et al. .............. 702/189 |
| 6,697,948 | B1 * | 2/2004 | Rabin et al. ................... 726/30 |
| 6,989,753 | B1 * | 1/2006 | Lamming et al. ......... 340/573.1 |
| 7,137,137 | B2 * | 11/2006 | Hayasaka et al. ............. 725/54 |
| 2004/0015477 | A1 * | 1/2004 | Beck et al. ...................... 707/1 |
| 2004/0021570 | A1 * | 2/2004 | Maloney .................. 340/568.1 |
| 2004/0085208 | A1 * | 5/2004 | Fukuoka .................. 340/572.1 |
| 2004/0172270 | A1 * | 9/2004 | Sugimoto et al. .............. 705/1 |
| 2004/0212500 | A1 * | 10/2004 | Stilp .......................... 340/541 |

FOREIGN PATENT DOCUMENTS

EP 1445723 * 8/2004 .................... 17/60

OTHER PUBLICATIONS

Hans Dobbertin et al. "RIPEMD-160:, A strengthened Version of RIPEMD", Apr. 18, 1996 pp. 1-13.*
Kevin McCurley, A fast portable implementation of the secure hash algorithm, III, 1994, pp. 1-8.*
P.Kitsos et al. "whirlpool hash function: architecture and VLSI implementation", IEEE 2004, ISCAS pp. 893-896.*
W.Fumy et al. "Integrity Primitives for IBC", no date.*
Abdul Hamid et al. "An efficient message digest algorithm (MD) for data security", IEEE 2001, pp. 191-197.*
Mik Lamming, et al.; "SPECs: Personal Pervasive Systems"; Invisible Computing, Jun. 2003; pp. 109-111.

* cited by examiner

*Primary Examiner*—Brandon S Hoffman (57) ABSTRACT

Methods and systems for generating time-based identifiers that are used for identifying items is described. In one embodiment, a master key is assigned to an electronic tag. Time-based other keys are generated based on the master key. Time-based identifiers are generated based on the time-based other keys. The time-based identifiers are useful only for a period of time to a holder of the time-based other keys.

22 Claims, 4 Drawing Sheets

METHOD AND SYSTEM FOR GENERATING TIME-BASED IDENTIFIERS

TECHNICAL FIELD

Embodiments of the present invention relate to pervasive computing and more specifically to identifying items using time-based identifiers.

BACKGROUND ART

The fact that technology is moving beyond the personal computer to everyday items is becoming a reality as computing devices are becoming progressively smaller and more powerful. Pervasive computing involves associating small electronic devices (also known as "tags") that have unique tag identifiers (UTID) with items for the purpose of gathering information about the items, such as their location and pattern of movement. Examples of items include, but are not limited to, people, places and objects. Objects include, but are not limited to trees, clothing, cell phones, laptops, etc. UTIDs may be serial numbers that are stored in read only memory (ROM) associated with the tags, for example.

The tags may communicate the UTIDs associated with them to other devices. For example, the tags may broadcast the UTIDs and other devices may be listening for the broadcast. In another example, the other devices may read the UTID from the tag, for example, by "swiping" the tag against the other devices.

Since tags can communicate the UTIDs associated with them to other devices, the tags may be used to locate items or determine items' patterns of movement. For example, a tag may be placed in the label of a shirt so that a store can locate the shirt after a customer moved it from the rack. In another example, tags may be inserted under a pet's skin so the pet can be located if it gets lost. In a third example, a person may be tracked because they are carrying a cell phone that broadcasts a UTID. The tag may be incorporated into the item itself as opposed to being a separate entity. For example in the case of the cell phone, the tag may be inside of the cell phone.

Since devices can listen for or read the UTIDs, there is a threat that people's privacy may be compromised. Until recently, the threat of compromising people's privacy has been limited because the infrastructure for doing so is not yet widespread, tracking software is not yet very sophisticated, and people can in any case easily switch off their portable devices, such as their cell phones.

However, as the technology advances, the probability of people's privacy being invaded due to this technology is increasing. For example, a tag may be associated with a person in some fashion, such as embedding the tag in the person's belt. The tag in the belt may transmit its UTID. Other devices that are associated with various places that the person comes near during their daily activities may recognize and identify not only the person but may collect information about their pattern of movement based on the UTID that the belt's tag broadcasts. The identification of the person and/or the information about their pattern of movement may be used to compromise the person's rights to privacy that are protected under the law.

For these and other reasons, a method and/or a system that ensures privacy would be valuable.

DISCLOSURE OF THE INVENTION

The present invention provides for security. The present invention provides privacy.

Embodiments of the present invention pertain to methods and systems for generating time-based identifiers is described. In one embodiment, a master key is assigned to an electronic tag. Time-based other keys are generated based on the master key. Time-based identifiers are generated based on the time-based other keys. The time-based identifiers are useful only for a period of time to a holder of the time-based other keys.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

OVERVIEW

Typically in pervasive computing a UTID is associated with a tag that is placed on or incorporated into an item for the purposes of identifying the item. This can be accomplished by the tag transmitting the UTID to other devices, such as readers.

According to one embodiment of the present invention, identifiers are generated based, at least in part, on one or more keys to prevent recognition of the identifiers and determination of what items the time-based identifiers are associated with. According to another embodiment, the keys are securely generated to prevent devices, such as readers, from recognizing the identifiers that are generated based on the keys. As a result, the present invention addresses one of the problems in the prior art where devices, such as readers, use received identifiers to recognize items and invade the privacy of people.

According to one embodiment, identifiers are time-based (referred to hereinafter as "time-based identifiers" and therefore can only be used for a period of time to identify an item. For example, even if a reader recognizes a time-based identifier that an item is transmitting and determines what item the time-based identifier is associated with, the time-based identifier is only good for a period of time, thus, the reader would only be able to collect information about the item during that period of time. As a result, the present invention addresses another problem with the prior art using fixed UTIDs, e.g., identifiers, that remain the same indefinitely. For example, once prior art devices, such as readers recognizes the identifier, the devices have the identifier indefinitely and therefore can collect information about the item the identifier is associated with indefinitely.

According to another embodiment, one tag may become friends with another tag by providing one or more of its keys to the other tag. In this case the friendship is uni-directional. According to still another embodiment, the tags may become friends with each other by exchanging one or more keys. In this case, the friendship is bi-directional. According to yet another embodiment, the keys are only valid for a period of time and therefore the friendship lasts only for a period of time that may be defined by the keys that one tag provides to another tag, as will be described in more detail.

Tags may be used for tracking an Alzheimer patient's pattern of movement, according to one embodiment. For example, the patient may check into an assisted living facility for two weeks. The patient may be capable taking care of many of their own needs provided the patient is given a certain amount of assistance, such as reminders to take medication. Assume that one tag A is placed on the patient and another tag B is placed on a container of medications. Further assume that the tags A and B are made friends for two weeks. When the patient takes their medications, tag A and tag B come into close proximity to each other. The tags can determine that they are friends and logic associated with the tags can determine that the patient took their medication at the appropriate time. Additionally, tags may be placed in various places where the patient goes, such as the bathroom, the kitchen, their car, their doctor's office, etc. to track the patient's pattern of movement. Since the tags A and B are friends with each other but not with other devices that may be participating in other applications, the devices in those applications cannot be used to intrude on the person's privacy.

Tags may be used for determining whether a person has left something important behind, according to another embodiment. For example, it may be important to a person to take their briefcase home from work. In this case, tags may be associated with the person's body, their briefcase, their car, and their desk at work and these tags may be setup to be friends. While at work, the tags on their body, their desk and the briefcase may all be receiving time-based identifiers from each other. Logic in the tags can determine that the person is at work and their briefcase is with them. Assuming the person leaves their briefcase at work and gets in their car, the tags on their body and on the car can determine that the briefcase is not with the person. Since the tags on the briefcase, the desk, the car, and on the body of the person are friends with each other but not with other devices that may be participating in other applications, the devices in those applications cannot be used to intrude on the person's privacy.

Tags may be used for exchanging information associated with business cards, according to still another embodiment. For example, tags may be associated with contractor's business cards. The contractor's may be hired for a specified length of time. The tags of each contractor's business card may be setup so that each business card can only be friends with other contractor's business cards for the duration of their contract.

Time-Based Hierarchy Of Keys

Figure 1:
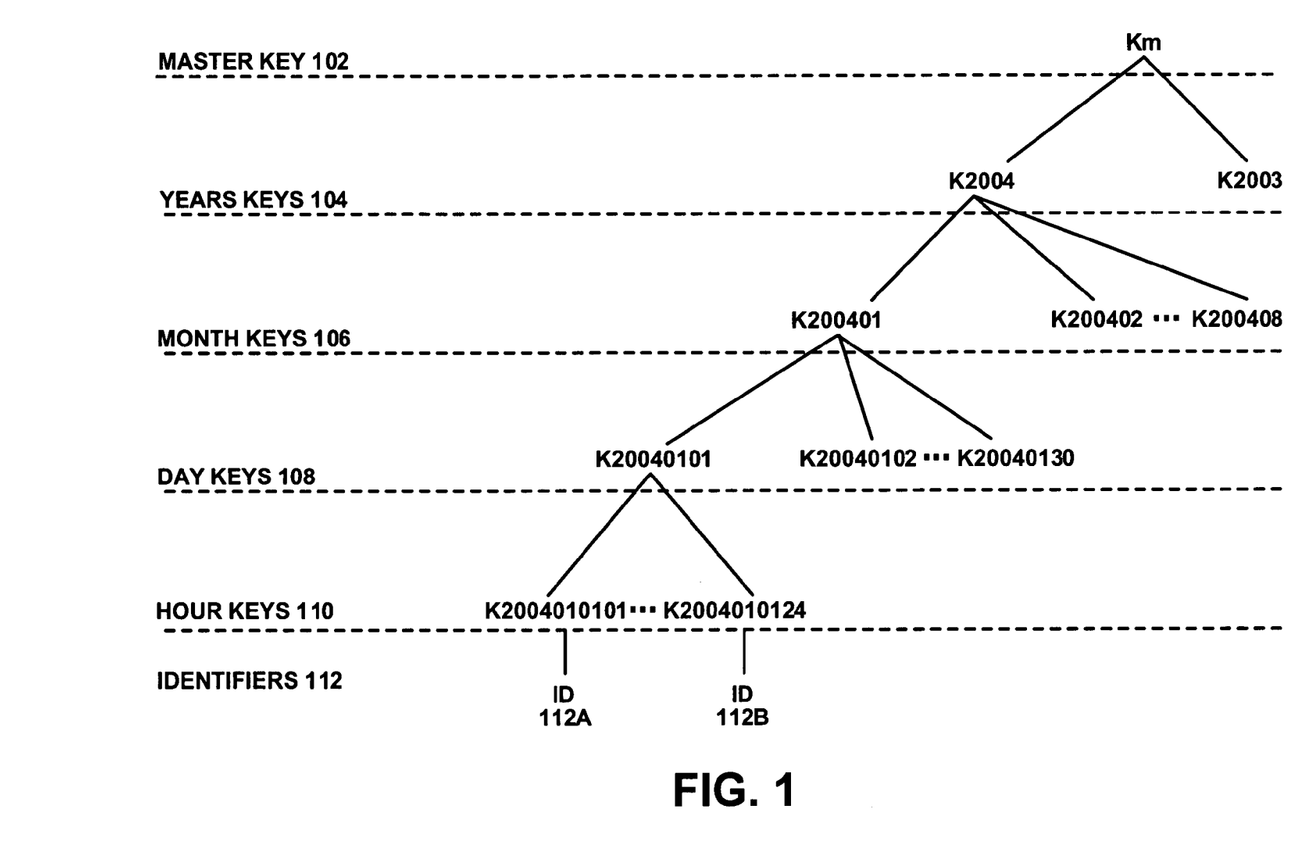
FIG. 1 depicts a time-based hierarchy of keys which may be associated with a tag, according to one embodiment of the present invention.

FIG. 1 depicts a time-based hierarchy of keys which may be associated with a tag, according to one embodiment of the present invention. A master key 102, Km, is a unique number that is associated with a particular tag, according to one embodiment. For example, master keys may be associated with each item, such as articles of clothing, in a store. In this case, each of the master keys may be assigned to tags and the tags placed in the labels of each of the articles of clothing.

According to another embodiment, a UTID may also be associated with a particular tag for identifying the particular item, as will become more evident.

The master key 102 is associated with an item and is preserved indefinitely, according to still another embodiment. Time-based other keys are generated based on the master key 102 (Km), according to another embodiment. For example, time-based other keys 104, 106, 108, 110 (e.g., $K_{2004}$, $K_{2005}$, $K_{200401}$, $K_{200402}$ ... $K_{200408}$, $K_{20040101}$, $K_{20040102}$ ... $K_{20040130}$, $K_{2004010101}$ ... $K_{2004010124}$) may be generated based on the master key.

According to one embodiment, the master key is a private key. In this case, the master key provides privacy from other devices recognizing the tag the master key is associated with. Similarly, since the master key provides privacy, the time-based other keys 104, 106, 108, 110 that are generated based on the master key 102 also provide privacy.

According to still another embodiment, the master key 102 and the time-based other keys 104, 106, 108, 110 form a time-based hierarchy of keys, as depicted in FIG. 1. For example, one or more year keys 104 ($K_{2004}$, $K_{2005}$) may be generated based on the master key 102 (Km), one or more month keys 106 ($K_{200401}$, $K_{200402}$ ... $K_{200408}$) may be generated based on the year keys 104, one or more day keys 108 ($K_{20040101}$, $K_{20030102}$ ... $K_{20040130}$) may be generated based on the month keys 106 and one or more hour keys 110 ($K_{2004010101}$ ... $K_{2004010124}$) may be generated based on the day keys 108.

To be more specific as depicted in FIG. 1, year keys 104 ($K_{2004}$, $K_{2005}$) are generated on the basis of the master key 102 and represent the item for a particular year, according to one embodiment. In this case, $K_{2004}$ is a key for a particular item during the year of 2004. Month keys 106 ($K_{200401}$, $K_{200402}$ ... $K_{200408}$) are generated on the basis of the year keys 104 and represent the item for particular months of the year, according to another embodiment. In this case, $K_{200401}$ represents January of 2004, $K_{200402}$ represents February of 2004 and $K_{200408}$ represents August of 2004. Day keys 108 are generated on the basis of the month keys 106 and represent the item for particular days of the months, in yet another embodiment. In this case, $K_{20040101}$ represents Jan. 1, 2004, $K_{20040102}$ represents Jan. 2, 2004, and $K_{20040130}$ represents Jan. 30, 2004. Hour keys 110 are generated on the basis of the day keys 108 and represent the item for particular hours of the days, in still another embodiment. In this case, $K_{2004010101}$ represents the first hour of Jan. 1, 2004 and $K_{2004010124}$ represents the 24$^{th}$ hour of Jan. 1, 2004.

The time-based other keys 104, 106, 108, 110 ($K_{2004}$, $K_{2005}$, $K_{200401}$, $K_{200402}$ ... $K_{200408}$, $K_{20040101}$, $K_{20040102}$ ... $K_{20040130}$, $K_{2004010101}$ ... $K_{2004010124}$) are generated with hash functions, according to one embodiment. For example, the year key $K_{2004}$ may be computed with $K_{2004}$=H(Km, 2004), where H( ) is a hash function. The month key $K_{200401}$ for January, 2004 may be computed as $K_{200401}=H(K_{2004}, 01)$. Similarly, the day key $K_{20040130}$ for Jan. 30, 2004 may be computed as $K_{20040130}=H(K_{200401}, 30)$, and so on. According to another embodiment, the hash function H( ) is a secure hash function such as MD4 & MD5 (Message Digest algorithms), SHA (Secure Hash Algorithm), and RIPEMD (RACE Integrity Primitives Evaluation Message Digest). According to yet another embodiment, H( ) may be a one way hash function. Also, in some implementations, digital signature schemes may also be used.

Keys are 160 bits in length, according to one embodiment. In this case, each of the keys 102, 104, 106, 108, 110 ($K_m$, $K_{2004}$, $K_{2005}$, $K_{200401}$, $K_{200402}$ ... $K_{200408}$, $K_{20040101}$, $K_{20040102}$ ... $K_{20040130}$, $K_{2004010101}$ ... $K_{2004010124}$) depicted in FIG. 1 may be 160 bits long. When a month value, such as 01 for January, is concatenated onto a year key, such as $K_{2004}$, the resulting value is longer than 160 bits long. When the hash function is performed, e.g. $K_{200401}=H(K_{2004}, 01)$, the resulting value is reduced back down to 160 bits, according to one embodiment, so that $K_{200401}$ is 160 bits long. According to another embodiment, the keys may be greater than 160 bits. For example, the keys may be 256 bits in length.

Time-based identifiers 112 are generated on the basis of hour keys 110, according to one embodiment. For example, time-based identifier 112A may be generated on the basis of hour key $K_{2004010101}$ and time-based identifier 112B may be generated on the basis of hour key $K_{2004010124}$.

Time-based identifiers 112 are generated using a hash function, according to still another embodiment. For example, a hash function may be used on the hour keys 110 to generate the time-based identifiers 112. According to another embodiment, time-based identifiers are 32 bits in length. In this case, a 32 bit hash function may be performed on the hour keys 110 to reduce 160 bit long hour key, such as $K_{2004010101}$, to a 32 bit time-based identifier, such as ID 112A.

As previously discussed, time-based identifiers may be generated on the basis of hour keys. However, according to another embodiment, time-based identifiers could be generated on the basis of the year keys, month keys, or day keys instead.

The master key may be associated with a particular item when the item is manufactured, according to one embodiment. The master key may be associated with the item any time before the tag is used for identifying the item by broadcasting the tag's time-based identifiers, according to another embodiment.

The time-based other keys 104, 106, 108, 110 may be associated with a particular tag during manufacturing, according to one embodiment. The time-based other keys 104, 106, 108, 110 may be associated with a particular tag any time before the tag is used for identifying the item by broadcasting the tag's time-based identifiers, according to another embodiment. The time-based other keys 104, 106, 108, 110 may be associated with the tag, according to one embodiment, or generated by the tag itself, according to another embodiment.

According to one embodiment, a new master key may be re-assigned to a device. For example, after a tag was assigned one master key, a trusted device may assign a new key to the tag. In this case, a new set of time-based other keys 104, 106, 108, 110 may be generated based on the new master key.

Establishing A Friendship With A Tag

As already discussed, tags can establish friendships with other tags by providing one or more keys to the other tags.

According to one embodiment, the channel for exchanging keys is secure. For example, tag A and tag B may exchange keys in a manner that other tags can not determine what the keys are. In one case, keys may be exchanged securely by touching one tag to another tag.

As already described herein, tags provide hour keys to make another tag a friend. For example, if tag A provides 7 hour keys to tag B, then tag B is friends with tag A for the 7 hours indicated by the 7 hour keys. In another embodiment, tags may provide year keys, month keys, or day keys to make another tag a friend. For example, if tag A provides an hour key for the last day of November 2004, and a month key for December, 2004 to tag B, then tag B is friends with tag A for the last day of November 2004, and the month of December, 2004.

According to yet another embodiment, the decision of whether to provide one set of keys rather than another set of keys when forming a friendship may depend on the storage and/or the computing capacity of a tag. For example, if a particular receiving tag has a lot of computing capacity in combination with a low amount of storage, it may be provided with a month key to establish a month long friendship. Then the high computing capacity tag may compute all of the day and hour keys based on the month key it received. In contrast, if a particular receiving key has low computing capacity in combination with a high amount of storage capacity, it may be provided with hour keys for the entire month to establish a month long friendship.

In another case, user interfaces may be associated with tags. For example, a person may use a user interface (UI) associated with a particular tag A to specify a period of time, such as a month, so that a friendship with tag A will only exist for that month. Then tag A may make tag B its friend for the month entered into the UI by touching the tags together and providing time-based other keys to tag B for the specified month. Before the month is over, a person that is in control of tag A may interact with another user interface to a server on a network, to extend the friendship that tag A gave to tag B. Keys may be generated for the period of time that the friendship is extended. Tag B may then interact with the server via the network to receive the keys for extending the friendship.

According to another embodiment, if one tag is provided the master key of another tag, the first tag will be a friend of the second key indefinitely.

A System For Implementing A Tag

Figure 2:
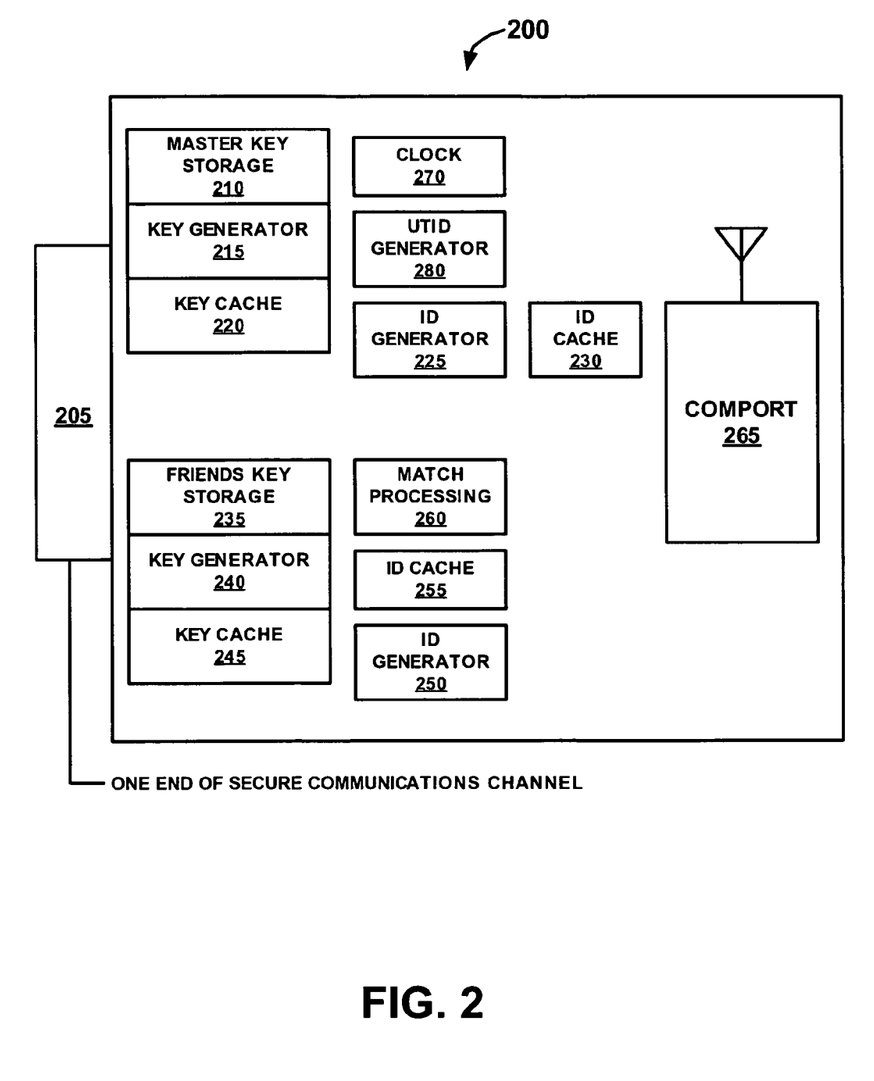
FIG. 2 depicts a block diagram of a system for implementing a tag for generating time-based identifiers, according to one embodiment.

FIG. 2 depicts a block diagram of a system for implementing a tag for generating time-based identifiers, according to one embodiment of the present invention. According to one embodiment, tag 200 may be an ASIC device, a FPGA device, or a microprocessor.

As depicted in FIG. 2, tag 200 includes a one end of a secure communications channel 205, master key storage 210, key generator 215, key cache 220, identifier generator 225, identifier cache 230, comport 265, a clock 270, a UTID generator 280, friend key storage 235, key generator 240, key cache 245, identifier generator 250, identifier cache 255, and match processing 260.

According to one embodiment, the UTID generator generates a UTID for tag 200. According to another embodiment, one end of a secure communications channel 205 receives a master key for assigning the master key to tag 200. The master key may be stored in master key storage 210. Key generator 215 generates time-based other keys, such as the time-based other keys depicted in FIG. 1. According to one embodiment the time-based other keys are generated based on the master key that is stored in master key storage 210. The time-based other keys may be cached in key cache 220. The identifier generator 225 may generate identifiers based on one or more time-based other keys stored in key cache 220. Identifier cache 230 may store time-based identifiers that were generated by identifier generator 225.

According to one embodiment, the identifier generator 225 may generate time-based identifiers for hour keys on an hour by hour basis. For example, identifier generator 225 may generate a time-based identifier for the 1st hour for the second day of January, 2004 at precisely one second before the 1st hour of the second day of January, 2004 and the identifier cache 230 may store it until precisely one second before the 2nd hour of the second day of January, 2004. Then the identifier generator 225 may generate a new time-based identifier for the 2nd hour of the second day of January, 2004 at precisely one second before the $3^{rd}$ hour of the second day of January, 2004, and so on. According to one embodiment, a clock 270 may be used to determine when a new time-based identifier should be generated. According to still another embodiment, a clock 270 may be used to determine when time-based identifiers that are stored in identifier cache 230 may be transmitted and/or broadcast to other tags.

Comport 265 may transmit one or more time-based identifiers (referred to hereinafter as "transmitted time-based identifiers") that are in identifier cache 230 to other tags, as will be described in more detail. Comport 265 may also receive time-based identifiers (referred to hereinafter as "received time-based identifiers") from other tags, as will be described in more detail. At some future time, time-based identifiers will no longer be provided from identifier cache 230, for example, when a friendship expires, according to one embodiment, as described herein. According to another embodiment, the time-based identifiers continue to be provided from identifier cache 230 but are no longer recognizable because other tags do not have the appropriate time-based other keys to recognize the provided time-based identifiers, as described herein. Comport 265 may use infrared (IR) or radio frequency (RF) technology to transmit and/or receive time-based identifiers, according to one embodiment.

At some point in time, another tag may become the "friend" of tag 200, according to another embodiment. For example, tag B may become a "friend" of tag 200 by transmitting one or more keys to tag 200. Tag 200 may receive tag B's keys (referred to hereinafter as "received keys") at one end of a secure communications channel 205 and store the received tags in friends keys storage 235. Key generator 240 may generate additional keys for tag B, as will be described in more detail. Key cache 245 may store the keys that key generator 240 generated as well as the received keys. The identifier generator 250 may generate time-based identifiers based on the keys stored in key cache 245. Identifier cache 255 may store time-based identifiers that were generated by identifier generator 250.

Match processing 260 may be used for determining whether received time-based identifiers are from friend tags based at least in part on keys stored in key cache 245, according to one embodiment. According to another embodiment, match processing 160 may be used to execute an algorithm, such as that for determining whether a person has left their briefcase at work, or an Alzheimer patient has taken their medication at the appropriate time of day. According to still another embodiment, a green/red led may be associated with the tag 200 to give a visual indication of what match processing 260 determines. For example, if the person has their briefcase with them, the led may be green. But if the person doesn't have their briefcase with them, the led may be red.

Although FIG. 2 depicts logic for transmitting and receiving time-based identifiers, according to another embodiment, an electronic tag may only have logic for transmitting identifiers (e.g., a transmitting device) or may only have logic for receiving identifiers (e.g., a receiving device). A transmitting device may, for example, have logic for 265, 210, 215, 220, 270, 280, 225, 230, and 205. A receiving device may, for example, have logic for 265, 210, 270, 280, 205, 235, 240, 245, 260, 255, and 250.

An electronic tag 200 may be implemented as hardware or as software or as a combination of hardware and software. In the case of a hardware implementation, tag 200 may be imbedded in another device or may be an integrated part of another device. In the case of a software implementation, tag 200 may be a module of computer instructions. The software could be downloaded onto a device to provide the functionality of an electronic tag on the device. In another example, a protocol that is used to communicate with the device may cause the device to execute software instructions so that the device may provide the functionality of an electronic tag. The device may provide the functionality of an electronic tag in addition to whatever functionality the device originally had.

FIG. 2 is a block diagram of an exemplary system in which embodiments of the present invention can be implemented. The blocks in FIG. 2 can be arranged differently than as illustrated, can implement fewer features than were described herein or can be implemented with additional features that are not described herein. For example, instead of caching keys and time-based identifiers, tag 200 may re-generate the keys and time-based identifiers periodically, thus, the caches could be omitted.

Additionally, instead of generating keys for a friend tag in key generator 240, the friend tag may provide all of the necessary keys when the friendship was formed, according to one embodiment. For example, in one case tag B may provide a month key to tag A to establish a friendship. Tag A may generate day keys for that month and hour keys for all of the day keys in order to generate time-based identifiers based on the hour keys. Alternatively, tag B may provide the hour keys to tag A so that tag A will not have to generate day and hour keys based on a month key. Thus, key generator 240 may be omitted.

AN OPERATIONAL EXAMPLE

Figure 3A:
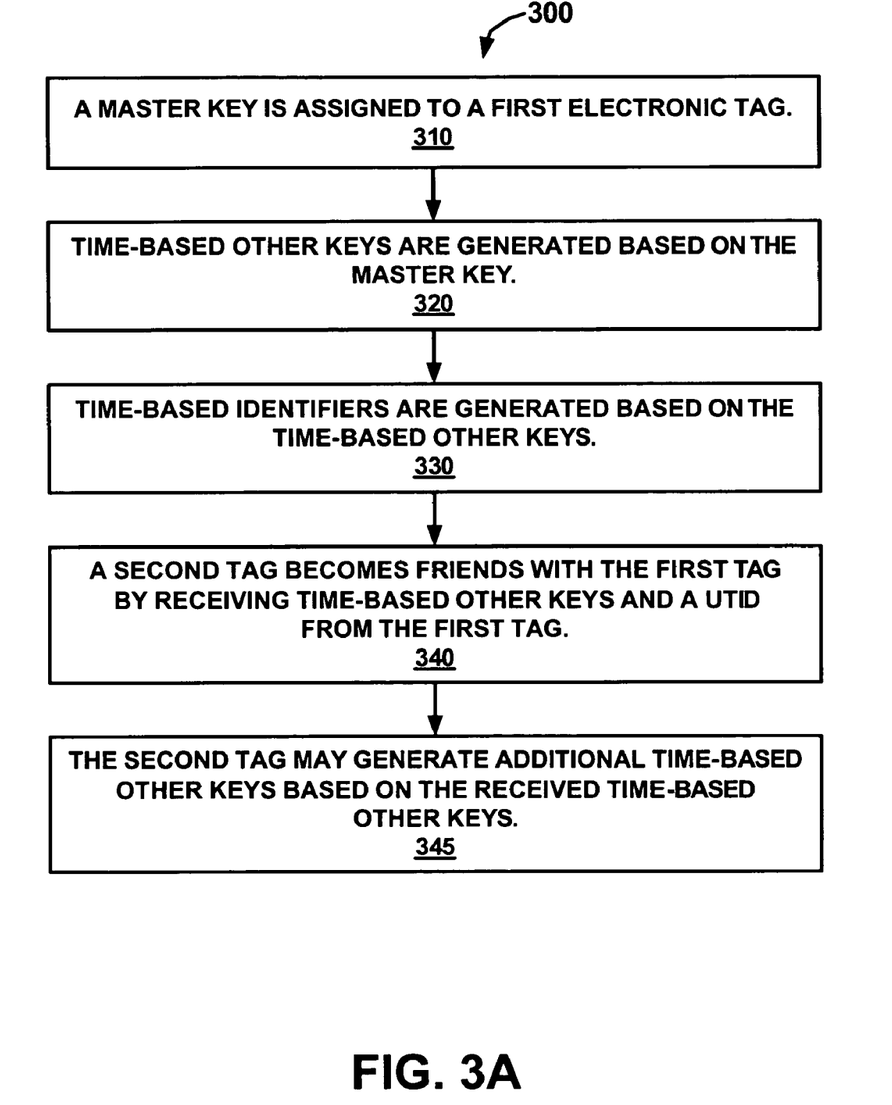
FIGS. 3A and 3B depict a flowchart for making and using time-based identifiers, according to embodiments of the present invention.
Figure 3B:
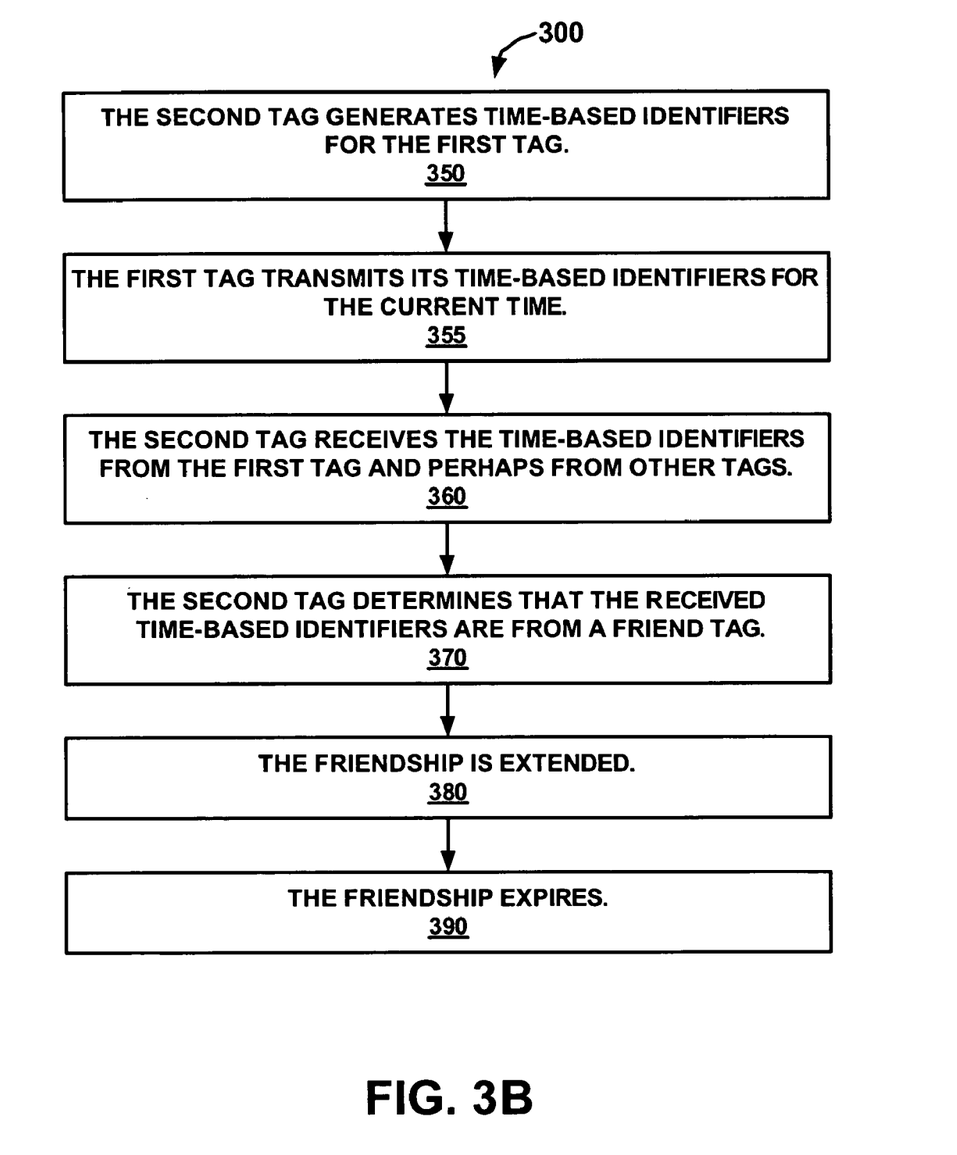

FIGS. 3A and 3B depict flowchart 300 for making and using time-based identifiers, according to embodiments of the present invention. Although specific steps are disclosed in flowchart 300, such steps are exemplary. That is, embodiments of the present invention are well suited to performing various other steps or variations of the steps recited in flowchart 300. It is appreciated that the steps in flowchart 300 may be performed in an order different than presented, and that not all of the steps in flowchart 300 may be performed. All of, or a portion of, the embodiments described by flowchart 300 can be implemented using computer-readable and computer-executable instructions which reside, for example, in computer-usable media of a computer system or like device.

For the purposes of illustration, assume that tags are used for tracking the locations of shirts in a clothing store and for updating the store's inventory. The tags can be used to locate shirts if a customer removes the shirt from the rack where it belongs and lays it some where else. Further, when a customer buys the shirt, the store's ability to identify the time-based identifiers provided by a tag on the shirt will terminate, as will be described in more detail. In this operational example, the store shall assume that shirts are usually bought within a month of being placed on the racks. Also assume that the friendship between the store and the shirt, may be extended by moving a cart in close proximity to the shirt. For the purposes of illustration, assume that one tag A is placed in the label of one shirt and another tag B is placed on the cart.

For the purposes of illustration, assume that two tags A and B are implemented using system 200 depicted in FIG. 2. Further for the purposes of illustration, assume that for tag A, the reference numbers for the components in tag A shall be the reference numbers depicted in FIG. 2 concatenated with the letter A. For example, in FIG. 2 the one end of a secure communications channel has a reference number of 205, however, when referring to the one end of a secure communications channel for tag A, the one end of a secure communications channel shall have a reference number of 205A. Similarly, when referring to the components for tag B, the letter B shall be concatenated onto the reference numbers as depicted in FIG. 2.

Referring to FIG. 3A, in step 310, a master key is assigned to an electronic tag. For example, the manufacturer of the shirt may insert tag A into the label of the shirt and then assign a master key to tag A via one end of a secure communications channel 205A. The master key may be stored in master key storage 210A.

In step 320, time-based other keys are generated based on the master key. For example, at some point in time, the shirt is purchased by a clothing store. The clothing store anticipates that it will place the shirt on the rack on Mar. 24, 2004. Since, the clothing store assumes that shirts are bought within a month of being placed on the rack, the tag may generate time-based other keys for the year 2004, the month of March, the month of April, and the days from March 24 through April 24. More specifically, the year key $K_{2004}$ is computed with $K_{2004}=H(Km, 2004)$, where H( ) is a hash function. The month key $K_{200403}$ for March, 2004 may be computed as $K_{200403}=H(K_{2004}, 03)$. The month key $K_{200404}$ for April, 2004 may be computed as $K_{200404}=H(K_{2004}, 04)$. Similarly, the day key $K_{20040324}$ for Mar. 24, 2004 may be computed as $K_{20040324}=H(K_{200403}, 24)$. The day keys for March 25 through April 24 may be computed in a similar fashion. The hour keys for all of the day keys from March 24 through April 24 may be computed in a similar fashion based on the day keys form March 24 through April 24.

According to one embodiment, the store may cause key generator 215A to generate the time-based other keys for the year 2004, the months of March and April, and the days from March 24 through April 24. For example, the store may trigger the key generator 215A to generate the time-based other keys by moving the cart in close proximity to the shirt with tag A. The time-based other keys (e.g., the keys for the year 2004, the month of March, the month of April, and the days from March 24 through April 24) may be cached in key cache 220A, according to another embodiment. On an hour by hour basis, hour keys may be generated for the day keys from March 24 through April 24, according to still another embodiment.

In step 330, time-based identifiers are generated based on the time-based other keys. For example, the identifier generator 225A may generate time-based identifiers based on one or more hour keys from March 24 through April 24 stored in key cache 220A. These time-based identifiers may be generated on an hour by hour basis. Identifier cache 230A may store the time-based identifiers that were generated by identifier generator 225A.

In step 340, a second tag becomes friends with the first tag by receiving time-based other keys and a UTID from the first tag. For example, tag A in the shirt may provide its day keys for March 24 through April 24 to tag B in the cart over one end of a secure communications channel 205A, thus, a unidirectional friendship may be formed tag B becomes friends with tag A but not vice versa. Further, tag A may transmit its UTID to tag B. Tag B may receive tag A's time-based other keys, as well as tag A's UTID, via one end of a secure communications channel 205B. Tag B may store the keys and UTID it received from tag A in its key storage 235B. In one case, the store may cause tag A, which is in a shirt's label, to become friends with tag B, which is associated with the cart, by moving the cart in close proximity to the shirt.

According to one embodiment, a tag's identity must be proven in order to receive time-based other keys from another tag. For example, an encrypted channel between tag A and tag B may be setup for the exchange of digital certificates, thereby proving identity. In so doing, tag A may securely transmit time-based other keys to tag B.

In step 345, the second tag may generate additional time-based other keys based on the received time-based other keys. For example, tags A transmitted day keys for March 24 through April 24 , e.g., time-based other keys, in step 340. However, in this operational example, tag A broadcasts time-based identifiers that are based on hour keys. Therefore, key generator 240B may generate hour keys based on the day keys that tag B received from tag A. Key generator 240B may generate these hour keys on an hour by hour basis.

Referring to FIG. 3B, in step 350, the second tag may generate time-based identifiers for the first tag. For example, tag B may generate time-based identifiers at identifier generator 250B based on the hour keys stored in its keys storage 235B. Assume, that the identifier generator 250B generates time-based identifiers on an hour by hour basis, as already described herein. The identifier cache 255B may store the time-based identifiers that were generated by the identifier generator 250B.

In step 355, the first tag may transmit its time-based identifiers for the current time. For example, tag A may use comport 265A to broadcast the time-based identifier that is currently stored in identifier cache 230A. According to one embodiment, a time-based identifier may be transmitted every few seconds. For example, whatever time-based identifier is currently stored in identifier cache 230A may be transmitted every few seconds. Since this illustration assumes that time-based identifiers are generated on an hour by hour basis, a different time-based identifier is transmitted each hour. According to one embodiment, a time interval that is associated with the transmitted time-based identifier overlaps with the current time. For example, if the current time is 12:00, then the current time would overlap with a particular time-based identifier's (referred to hereinafter as time-based identifier X) time interval that starts at 12:00 and ends at 1:00. In this case, tag A may transmit time-based identifier X at 12:00.

In step 360, the second tag may receive the time-based identifiers from the first tag and perhaps from other tags. For example, tag B may receive at comport 265B whatever time-based identifier that tag A transmitted from comport 265A. The cart's tag B may also receive time-based identifiers from tags associated with other items of clothing in the store.

In step 370, the second tag may determine that the received time-based identifiers are from a friend tag. For example, tag B may use match processing 260B to determine the time-based identifier it received is from a friend, e.g., tag A. For example, tag B may use match processing 260B to match the time-based identifiers that tag B received from tag A to the time-based identifiers produced using the time-based other keys that tag B received from tag A in step 340. Further, tag B may map the time-based identifiers back to the UTID that tag B received from tag A in step 340.

By transmitting time-based identifiers, the cart, which has tag B, may locate a shirt, which has tag A, in the event that the shirt is moved. Further, inventory processing may be performed. For example, if tag B no longer receives time-based identifiers from tag A, the stores inventory may be updated to reflect that the shirt has been purchased and is no longer in the store. Store employees may use this information to determine that more shirts need to be placed on the racks, for example.

In step 380, the friendship is extended. For example, the store's personnel may move the cart around the store periodically to extend the friendship in the event that the merchandise was not bought within a period of time. To be more specific, if the shirt is not bought by the end of April 24, the shirt will still be in the store. When the store's personnel moves the cart around, the cart may cause tag A in the shirt to extend the friendship, for example, by another month. According to one embodiment, the friendship may be extended by tag A providing day keys for April 25 through May 24 to tag B, using the process already described in step 340.

In step 390, the friendship expires. For example, assume that someone bought the shirt before May 24, thus, the shirt is removed from the store by the end of May 24, 2004. Since the shirt is no longer in the store, the friendship will not be extended a second time when the cart is moved around the store. In this case, tag B may no longer recognize time-based identifiers transmitted by tag A because tag A will be generating new time-based identifiers based on subsequent hour keys, thus, the privacy of the person who bought the shirt is protected.

In the operational example described above, a tag in a shirt becomes the friend of a tag associated with a cart. In the context of stores, tags may also be associated with other devices and/or places in the store. For example, tags may be associated with store entrances and/or exit points, as well as devices that cashiers use.

In the operational example described above, tag A could be implemented as a transmitting device and tag B could be implemented as a receiving device.

In a second operational example, tags are used to track the locations of children during a field trip that lasts for five hours. In this case, tags may be associated with the children and any adults, such as teachers and/or parents, escorting the children on the field trip. In this case, a multi-directional friendship may be established between all of the tags that are associated with the children and the escorts.

Before the trip starts, master keys may have already been assigned to the tags, time-based other keys may have been generated based on the master keys, and time-based identifiers may have been generated based on the time-based other keys, in a manner similar to that described in steps 310, 320, and 330.

Some time before the trip starts or at the beginning of the trip, friendships may be established between each of the tags associated with the children and the escorts by exchanging time-based other keys for the five hours that the field trip will last, in a manner similar to that described in step 340. Each of the tags may generate time-based identifiers for each other in a manner similar to that described in step 350.

The tags associated with the children and the escorts may transmit their time-based identifiers for the current time, in a manner similar to that described in step 355 above. Each of the tags associated with the children and the escorts may determine that they are friend tags based on the time-based identifiers they receive from each other, in a manner similar to that described in step 360 above. In so doing, escorts may use this technology to locate a missing child. An adult may move around and if they come into close proximity of a lost child, an LED associated with the adult's tag may turn green. In yet another example, a device, which picks up the broadcasted identifiers from the lost child's tag, may be used in combination with a Global Positioning System (GPS) to locate the missing child. Further, stalkers cannot exploit this technology to track children because their tags are not friends with the children's tags and therefore do not have the necessary other keys to recognize time-based identifiers provided by the children's tags.

When the five hours for the field trip is over the friendship between the tags expires and the tags will stop transmitting time-based identifiers to each other. Thus, even escorts will not be able to determine the locations of children after the trip is over.

Alternatives and Extensions

A tag may provide a visual indication that a particular pattern has been recognized, according to one embodiment. For example, an LED may be associated with a tag and give a visual indication of whether a person's briefcase is with them. According to another embodiment, the tag may log information about what the tag recognized. For example, the pattern of movement of an Alzheimer patient may be logged with a computer.

Tags may be used to provide a person with a diary of their life, according to another embodiment. For example, a tag may be associated with the person and with various places the person goes. Information detailing the person's pattern of movement may be logged in a "diary" that the person may use to remember where they have been at important times in the past. As already described herein, the friendship between tags may be uni-directional. For example, the tags at various places the person goes may be friends with the tag on the person but not vice versa. Therefore, the tag on the person may be used to receive time-based identifiers from the tags at the various places the person goes and use the received time-based identifiers to determine the person's pattern of movement. Since, the tag on the person is not friends with the tags at the various places, the tags at the various places cannot be used to intrude on the person's privacy.

Although time-based other keys, such as year keys, month keys, hour keys, and day keys, were described herein as representing contiguous subsets of time, according to one embodiment, time-based other keys do not have to be contiguous subsets of time. For example, a day key could represent the hours a person worked from 9:00 am to 5:00 pm and a year key could represent all of the hours a person worked during a year. In a second example, there could be two day keys where one day key represents the hours a person worked and the second day key represents the hours the person didn't work. Similarly, there could be two year keys were one year key represents all of the hours a person worked in a year and the other year key represents all of the hours the same person didn't work in that year.

According to one embodiment, the time interval associated with a subkey of a particular key may be a subinterval of the particular key. For example, a day key is a subkey of a month key. Further, the time interval associated with a day key (e.g., a day) is a subinterval of the time interval associated with the month key (e.g., a month).

According to another embodiment, more than one time interval may be associated with a time-based identifier. For example, a day key may have a working day portion (e.g., 9:00 am to 5:00 pm) and a non-work portion (e.g., the rest of the hours of the day).

Although the examples described herein initially assigned the master key 102 to a tag, according to another embodiment, one or more keys may be associated with a tag. For example, referring to FIG. 1, the master key 102 and year keys 104 may be associated with a tag. Then month keys 106, day keys 108, and hour keys 110 may be generated based on the master key 102 and year keys 104. In a second example, a master key 102 is not assigned to a tag. Instead one or more other keys may be assigned to the tag. For example, year keys 104 may be assigned to the tag. Month keys 106, day keys 108 and hour keys 110 may be generated based on the year keys 104 that were assigned to the tag.

Although the examples described herein used keys to establish friendships between tags, time-based identifiers could be used to establish friendships, according to yet another embodiment. For example, referring to FIGS. 1 and 2, time-based identifiers 112A and 112B may be exchanged between two tags over their respective ends of a secure communications channel 205 to established a friendship for two one hour intervals associated with time-based identifiers 112A and 112B.

Although the examples described herein assumed that the clocks 270 (FIG. 2) associated with electronic tags 200 (FIG. 2) would be synchronized, in real life situations this may not be the case. Time intervals of nearby keys may be inspected to find a match, according to one embodiment. For example, if the clock 270 (FIG. 2) associated with a transmitting device is set at 12:02 when it transmits a time-based identifier and the clock 270 (FIG. 2) associated with the device that receives the time-based identifier is set to 11:58, the match processing 260 (FIG. 2) of the receiving device may initially assume that the received time-based identifier is associated with an hour key for 11:00 to 12:00 when in fact the received time-based identifier is associated with an hour key for 12:00 to 1:00. When match processing 260 (FIG. 2) does not find a match between the received time-based identifier and the hour key for 11:00 to 12:00, it could inspect its hour key for 12:00 to 1:00.

The processes associated with assigning and/or associating keys, generating keys, generating time-based identifiers etc., may be done repeatedly and in many different orders. For example, keys may be associated with a tag, other keys generated, then a second set of keys may be associated with the same tag and more keys generated based on the second set of keys.

What is claimed is:

1. A method for generating time-based identifiers, said method comprising:
   assigning a master key to an electronic tag, wherein the electronic tag is associated with an item;
   generating one or more time-based other keys using said master key, wherein said time-based other keys define a period of time and are configured to be transmitted to a holder to allow the holder to read data from time-based identifiers during the period of time defined by the time-based other keys;
   generating the time-based identifiers from said one or more time-based other keys such that said time-based identifiers are readable for the period of time defined by the time-based other keys by the holder of said one or more time-based other keys; and
   identifying the item associated with the electronic tag.

2. The method of claim 1, wherein said master key and said one or more time-based other keys form a time-based hierarchy of keys.

3. The method of claim 2, wherein said one or more time-based other keys consist of year keys, month keys, day keys, and hour keys to form said time-based hierarchy of keys, wherein the hour keys are generated using the day keys, the day keys are generated using the month keys and the month keys are generated using the year keys.

4. The method of claim 1, wherein said master key is valid for an indefinite period or time.

5. The method of claim 1, wherein said time-based other keys are used to de-crypt said time-based identifiers.

6. The method of claim 1, wherein said electronic tag is a first tag and said holder is a second tag, said method further comprising:
   making said first tag a friend of a second tag by communicating a set of time-based other keys from said first tag to said second tag, wherein said set of time-based other keys define said period of time.

7. The method of claim 1, said electronic tag is a first tag, said time-based other keys are first time-based other keys, and said time-based identifiers are first time-based identifier, said method further comprising:
   receiving at said first tag one or more second time-based identifiers from a second tag; and
   determining at said first tag that said second tag is a friend of said first tag based at least in part on said one or more second time-based identifiers and one or more second time-based other keys that were previously received from said second tag.

8. A transmitting device for transmitting time-based identifiers, said transmitting device comprising:
   storage for associating one or more keys with said transmitting device to identify an item associated with the transmitting device, wherein one or more time intervals are associated with each key and, wherein the keys are configured to be transmitted to a receiving device to allow the receiving device to read data from time-based identifiers during the time intervals associated with each key;
   an identifier generator for generating one or more of the time-based identifiers using said keys, wherein the time-based identifiers are operable to identify the item associated with the transmitting device;
   one end of a secure communications channel for providing at least one of said keys or at least one of said time-based identifiers to said receiving device to establish a friendship between said transmitting device and said receiving device; and
   a comport for transmitting a particular time-based identifier of said one or more time-based identifiers to said receiving device, during a particular time interval associated with said particular time-based identifier to allow the receiving device having the key for said particular time interval to read the particular time-based identifier and identify the item associated with the transmitting device.

9. The transmitting device of claim 8, wherein one or more of said keys are initial keys and wherein said transmitting device further comprises a key generator for generating one or more other keys based on one of said initial keys or said other keys.

10. The transmitting device of claim 9, wherein said key generator uses a one way hash function for generating said one or more other keys.

11. The transmitting device of claim 9, wherein said key generator generates a subkey for a particular key of said keys and wherein a time interval that is associated with said subkey is a subinterval of a time interval associated with said particular key.

12. A receiving device for receiving time-based identifiers, said receiving device comprising:
    one end of a secure communications channel for receiving one or more keys from a transmitting device, wherein the keys define a period of time;
    an identifier generator for generating one or more first time-based identifiers using said keys, wherein said one or more first time-based identifiers are operable to identify an item;
    a comport for receiving one or more second-time-based identifiers from said transmitting device; and
    match processing to determine that said one or more second time-based identifiers are from a friend based at least in part on said one or more first time-based identifiers matching said one or more second time-based identifiers.

13. A method for receiving time-based identifiers, said method comprising:
    receiving one or more keys over one end of a secure communications channel of a receiving device, wherein the keys define a period of time;
    generating one or more time-based identifiers based on said received keys, wherein said one or more first time-based identifiers are operable to identify an item;
    receiving a particular time-based identifier over a comport; and
    determining that said particular identifier is from a friend based at least in part on said one or more generated time-based identifiers.

14. The method of claim 13, wherein said one or more time-based identifiers are first time-based identifiers, said method further comprising:
    associating one or more keys with a transmitting device for identifying an item, wherein one or more time intervals are associated with each key;
    generating one or more second time-based identifiers based on said keys;
    providing one of at least one of said keys or at least one of said second time-based identifiers to said receiving device to establish a friendship with said receiving device; and
    transmitting said particular time-based identifier of said one or more time-based identifiers to said receiving device, wherein a particular time interval associated with said particular time-based identifier overlaps with the current time.

15. A computer-usable medium having computer-readable program code embodied therein for causing a computer system to perform a method of generating time-based identifiers, said method comprising:
    assigning a master key to an electronic tag, wherein the electronic tag is associated with an item;
    generating one or more time-based other keys using said master key, wherein said time-based other keys define a period of time and are configured to be transmitted to a holder to allow the holder to read data from time-based identifiers during the period of time defined by the time-based other keys;
    generating the time-based identifiers from said one or more time-based other keys such that said time-based identifiers are readable for the period of time defined by the time-based other keys by the holder of said one or more time-based other keys; and identifying the item associated with the electronic tag.

16. The computer-usable medium of claim 15, wherein said master key and said one or more time-based other keys form a time-based hierarchy of keys.

17. The computer-usable medium of claim 16, wherein said one or more time-based other keys consist of year keys, month keys, day keys, and hour keys to form said time-based hierarchy of keys, wherein the hour keys are generated using the day keys, the day keys are generated using the month keys and the month keys are generated using the year keys.

18. The computer-usable medium of claim 15, wherein generating time-based identifiers further comprises generating said time-based identifiers based on hour keys.

19. The computer-usable medium of claim 15, wherein said electronic tag is a first tag and said holder is a second tag, said method further comprising:
    making said first tag a friend of a second tag by communicating a set of time-based other keys from said first tag to said second tag, wherein said set of time-based other keys define said period of time.

20. The computer-usable medium of claim 15, said electronic tag is a first tag, said time-based other keys are first time-based other keys, and said time-based identifiers are first time-based identifiers, said method further comprising:
    receiving at said first tag one or more second time-based identifiers from a second tag; and
    determining at said first tag that said second tag is a friend of said first tag based at least in part on said one or more second time-based identifiers and one or more second time-based other keys that were previously received from said second tag.

21. A computer-usable medium having computer-readable program code embodied therein for causing a computer system to perform a method for receiving time-based identifiers, said method comprising:
    receiving one or more keys over one end of a secure communications channel of a receiving device, wherein the keys define a period of time;
    generating one or more time-based identifiers based on said received keys, wherein said one or more first time-based identifiers are operable to identify an item;
    receiving a particular time-based identifier over a comport; and
    determining that said particular identifier is from a friend based at least in part on said one or more generated time-based identifiers.

22. A computer-usable medium having computer-readable program code embodied therein for causing a computer system to perform a method for transmitting time-based identifiers, said method comprising:
    associating one or more keys with said transmitting device for identifying an item, wherein one or more time intervals are associated with each key;
    generating one or more time-based identifiers using said keys;
    providing one of at least one of said keys or at least one of said time-based identifiers to a receiving device to establish a friendship with said receiving device; and
    transmitting a particular time-based identifier of said one or more time-based identifiers to said receiving device to allow the receiving device having the key for said particular time-based identifier to read the particular time-based identifier and identify the item.

* * * * *

UNITED STATES PATENT AND TRADEMARK OFFICE
CERTIFICATE OF CORRECTION

| | | |
|---|---|---|
| PATENT NO. | : 7,581,108 B1 | Page 1 of 1 |
| APPLICATION NO. | : 10/829714 | |
| DATED | : August 25, 2009 | |
| INVENTOR(S) | : Denis Bohm et al. | |

It is certified that error appears in the above-identified patent and that said Letters Patent is hereby corrected as shown below:

In column 14, line 11, in Claim 4, delete "or" and insert -- of --, therefor.

In column 14, line 23, in Claim 7, delete "identifier," and insert -- identifiers, --, therefor.

In column 15, line 15, in Claim 12, delete "second-time-based" and insert -- second time-based --, therefor.

Signed and Sealed this

Seventh Day of September, 2010

David J. Kappos
*Director of the United States Patent and Trademark Office*